US006681471B1

(12) United States Patent
Finkelstein

(10) Patent No.: US 6,681,471 B1
(45) Date of Patent: Jan. 27, 2004

(54) METHOD OF PRODUCING A PANEL FASTENER

(75) Inventor: Burl Finkelstein, Newnan, GA (US)

(73) Assignee: Kason Industries, Inc., Shenandoah, GA (US)

( * ) Notice: Subject to any disclaimer, the term of this patent is extended or adjusted under 35 U.S.C. 154(b) by 0 days.

(21) Appl. No.: 10/365,978

(22) Filed: Feb. 13, 2003

Related U.S. Application Data

(60) Continuation of application No. 09/961,780, filed on Sep. 24, 2002, now Pat. No. 6,530,610, which is a division of application No. 09/473,752, filed on Dec. 28, 1999, now Pat. No. 6,409,235.

(51) Int. Cl.[7] ............................ B23P 11/00; E05C 3/04
(52) U.S. Cl. ......................................... 29/438; 292/210
(58) Field of Search .......................... 29/437, 438, 440, 29/513; 292/210, 111, 57, 65

(56) References Cited

U.S. PATENT DOCUMENTS 2,805,907 A 9/1957 Oom .......................... 311/107
3,023,487 A * 3/1962 Hinckley ................... 29/148.4
3,365,223 A 1/1968 Bisbing ................. 287/20.924
3,472,545 A 10/1969 Berkowitz .................. 292/111
3,671,006 A 6/1972 Berkowitz ................... 249/97
3,784,240 A 1/1974 Berkowitz .................. 292/111
4,020,613 A 5/1977 Reynolds ..................... 52/321
4,076,165 A * 2/1978 Latasiewicz ................ 228/136
4,239,100 A * 12/1980 Corey ....................... 193/35 R
4,349,217 A * 9/1982 Fohl ........................... 280/808
4,417,430 A 11/1983 Loikitz ........................ 52/584
4,512,122 A 4/1985 Berkowitz ................. 52/127.9
4,788,395 A 11/1988 Sakoda .................... 219/10.55
5,212,924 A 5/1993 Finklestein .................. 52/583
5,244,710 A 9/1993 Bricher et al. .............. 428/100
5,443,223 A * 8/1995 Yosin ......................... 242/379
5,452,925 A 9/1995 Huang ......................... 292/57
5,685,659 A * 11/1997 Brosius ....................... 403/65

* cited by examiner

*Primary Examiner*—Gary Estremsky
(74) *Attorney, Agent, or Firm*—Baker Donelson et al

(57) ABSTRACT

A panel fastener is produced by forming a casing blank with two coplanar sides unitarily connected together at one end by a bridge, bending the bridge to bring the two sides to a position parallel with each other about a portion of a hook, and fastening together the other ends of the two casing sides thereby rotatably capturing the hook.

1 Claim, 4 Drawing Sheets

METHOD OF PRODUCING A PANEL FASTENER

REFERENCE TO RELATED APPLICATION

This application is a continuation of application Ser. No. 09/961,780 filed Sep. 24, 2002 now U.S. Pat. No. 6,530,610 which is a division of application Ser. No. 09/473,752 filed Dec. 28, 1999, now U.S. Pat. No. 6,409,235.

TECHNICAL FIELD

The present invention relates generally to panel fasteners, and particularly to panel fasteners for large insulated panels like those used to form cooler room walls, floors and ceilings.

BACKGROUND OF THE INVENTION

Commercial walk-in coolers, like those commonly found in convenience stores and commercial food storage facilities such as super markets, are typically constructed of insulating wall, ceiling and floor panels that are fastened snugly together. The panel ends are shaped to fit together in tongue and groove fashion and are provided with latch type fasteners for drawing and holding adjacent panels together. The latches themselves commonly comprise a hook and cam assembly that is mounted to one panel for latching engagement with a pin that is mounted to an adjacent panel.

There are two main types of panel fasteners, nail-in-place and winged. Both types have a casing with two side walls formed with an annular opening defined by a boss with a curved lip. A cam has a shaft journaled in the boss and a hook mounted in camming engagement with it. Examples of these fasteners are shown in U.S. Pat. Nos. 3,784,240 and 3,671,006, respectively.

A casing boss with a curved lip is substantially easier and more economical to produce than one with a straight lip. However a curved lip renders the casing more susceptible to spreading in the area about the boss. As the hook engages the pin and pulls it, the cam shaft exerts a force on the side of the boss nearer to the pin. As a result, curved lipped boss exerts a spreading force on the casing.

This tendency for the casing to spread or bulge is even greater when the latch and pin are misaligned. Winged fasteners are usually mounted by being foamed in place using methods similar to the one shown in U.S. Pat. No. 5,212,924. Foam is injected inside the panel. As it hardens the fasteners become secured in place. Foam hardening often causes the casing of the hook to cock out of mutual alignment. As a result, when the hook engages the pin and pulls on it, the cam shaft pushes against the front of a casing side wall and spreads the hook assembly casing walls apart. The force exerted by the hook on the casing side wall, in combination with the funneling action of the boss, can even cause one side of the cam shaft to pull out of the boss opening and the fastener to malfunction.

The nail-in fastener hook assembly casings also often spread or bulge even though they are mounted to boards usually made of hardened foam. Foam boards are used because they provide good insulation, are inexpensive to manufacture, and are resistant to rotting and water damage. Upon fastening a nail-in panel fastener hook with a pin, the force on the hook often causes the foam board to be crushed or crinkled. This is attributable to the foam board lacking strength sufficient to resist spreading of the metallic walls of the casing. This crushing or crinkling of the foam board often enables the back of the casing to move closer together and the front portion to spread apart. The giving way of the foam board, in combination with the force of the cam shaft against the boss, can easily result in the casing walls spreading significantly. Indeed, the cam shaft may actually become dislodged from the boss resulting in the fastener malfunctioning.

Heretofore the two side walls of panel fastener casings have typically been held together by pins and interlocked tabs. For example, the model 1156 panel fastener that has long been sold by Kason Industries, Inc. has a two-piece casing. Each piece has a side wall with a central boss from which a mounting flange extends right angularly. Each end of each casing wall has one centrally located tab and two tabs that straddle the central tab. During assembly the two pieces are juxtaposed about so as to capture the hook and cam assembly. The tabs are then crimped or folded over each other. A dimple in the abutting tabs is then staked to the underlying tabs in securing together one end of the casing. The other open end, from which the hook emerges, is fastened together with a pin.

As previously explained, overload places a separation force on these two walls. This force can even cause the dimples to pop apart and the fastener to fail. Moreover, it is difficult to monitor the integrity of the dimples in quality control checks during manufacture. The overlapping tabs also is costly in material.

Accordingly, it is seen that a need has long existed for a panel fastener that is more resistive to bulging and failure of its casing during the high loads sometimes imparted during panel fastening. It is to the provision of a method of producing such that the present invention is primarily directed.

SUMMARY OF THE INVENTION

A method of forming and assembling a panel fastener comprises the steps of forming a casing blank with two coplanar sides unitarily connected together at one end by a bridge, bending the bridge to bring the two sides to a position parallel with each other about a portion of a hook.

DETAILED DESCRIPTION

Figure 1:
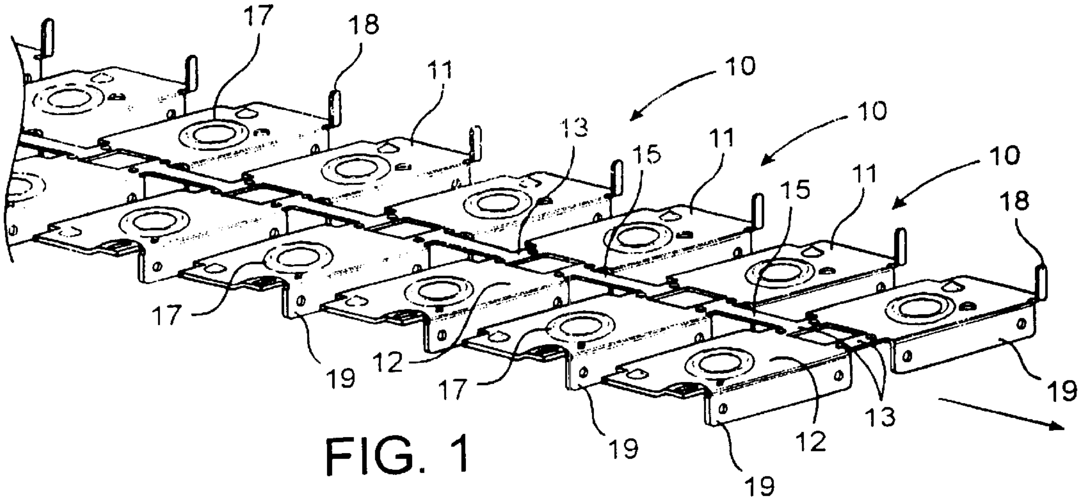
FIG. 1 is a perspective view of an in-line series of panel fastener casings being stamped and formed form a single sheet of metal.

The manner in which the new panel fastener is produced is illustrated in the drawing. First a sheet or strip of strong metal, preferably steel, is passed through an unshown series of stamping, trimming station and forming stations from which it emerges as shown in FIG. 1. Here it is seen to have an in-line series of partially formed casings 10. Each casing has two coplanar sides 11 and 12 joined together by two bridges 13 in their plane. Adjacent pairs are still joined here by a coplanar link 15 that extends behind an adjacent bridge 13 in each adjacent casing 10.

Each casing side is seen to be formed with a annular boss 17. A tab 18 projects upwardly from a corner of one side of each casing. A mounting flange 19 projects downwardly aside each casing side 11.

Figure 2:
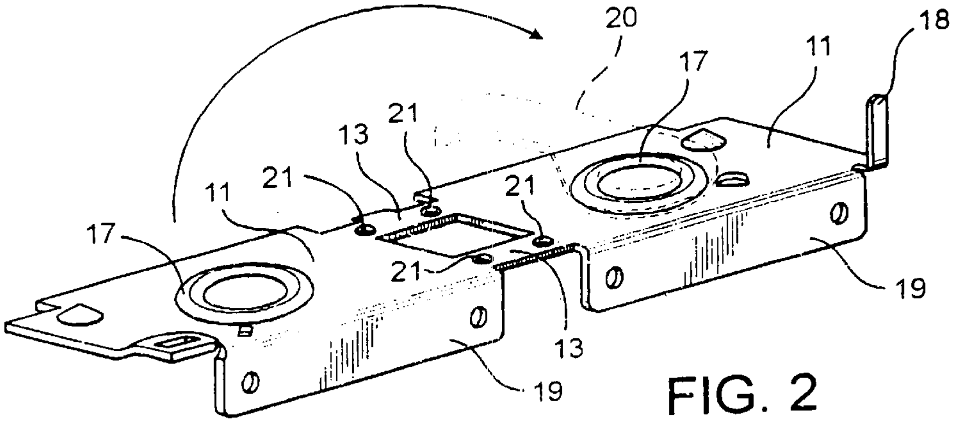
FIG. 2 is a perspective view of a single panel fastener casing that has been severed from the sheet shown in FIG. 2.

The sheet or strip of the formed metal is passed through a cutting station where the link 15 is cut thereby severing the casings one by one from the in-line strip. A single casing, thus severed, is shown in FIG. 2. From the enlarged view of this figure it is seen that each bridge is formed with two holes 21 located about tangentially with a side 11.

Figure 3:
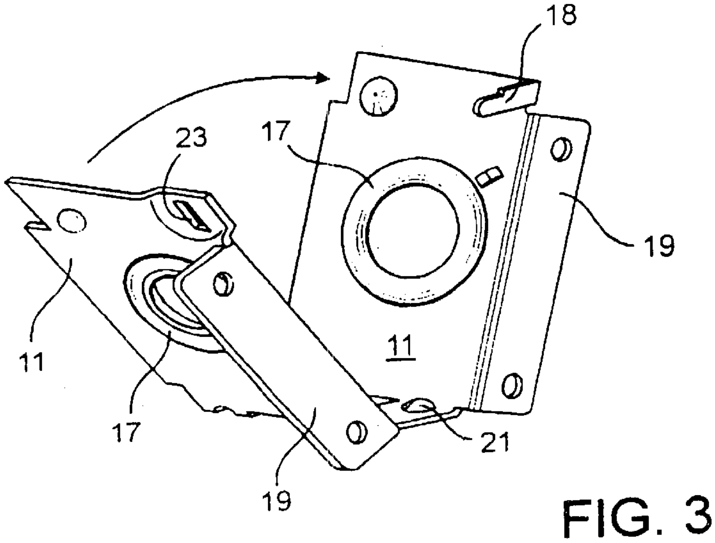
FIG. 3 is a perspective view of the casing being folded about the hook and cam assembly shown in broken lines in FIG. 2.
Figure 4:
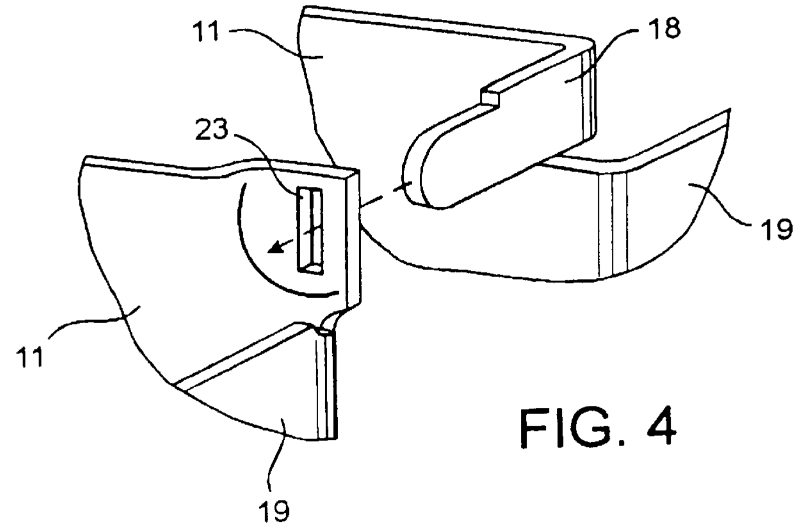
FIGS. 4–6 are perspective views of a portion of the casing showing one end of two casing sides being secured together.
Figure 5:
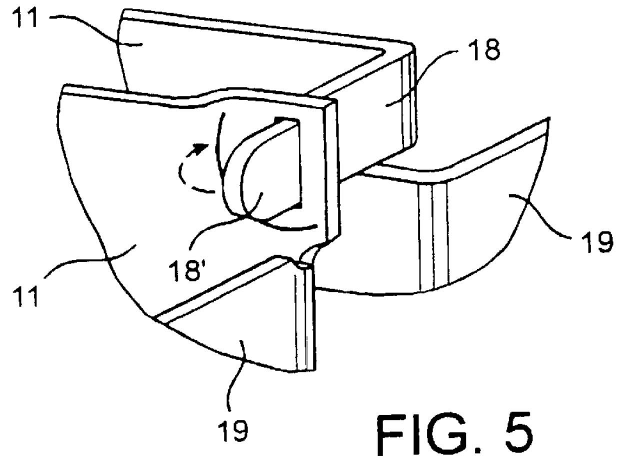
Figure 6:
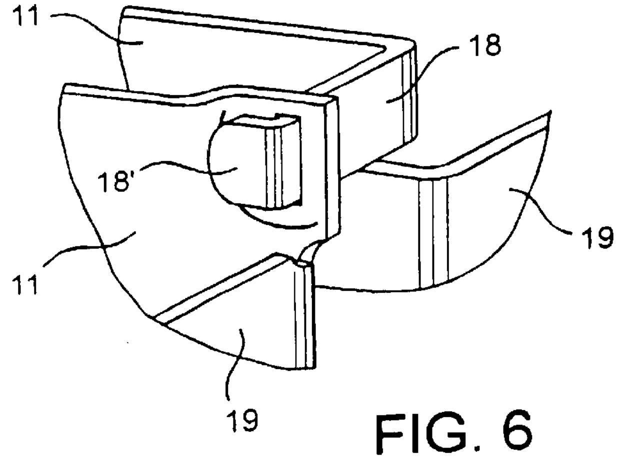
Figure 9:
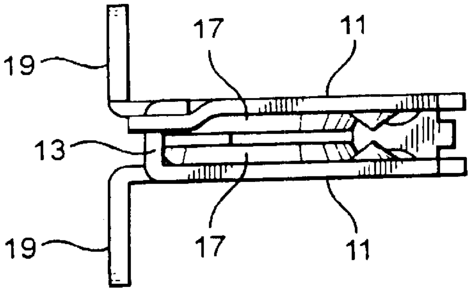
FIGS. 9 and 11 are top and bottom views of the finished casing without the hook and cam assembly.
Figure 8:
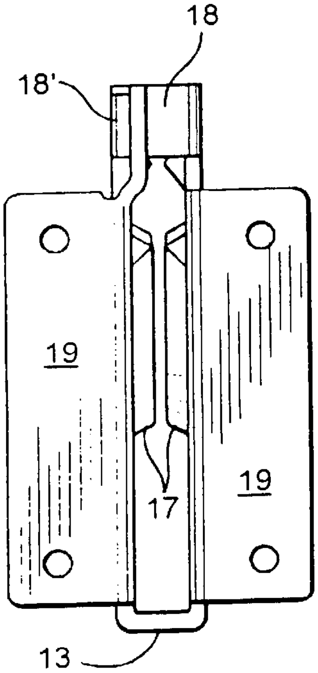
FIGS. 8 and 10 are front and rear end views of the finished casing without the hook and cam assembly.
Figure 7:
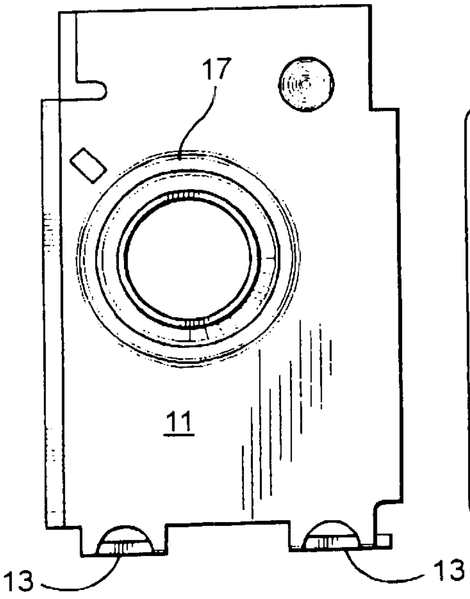
FIG. 7 is a side view of one side of the finished casing without the hook and cam assembly.
Figure 10:
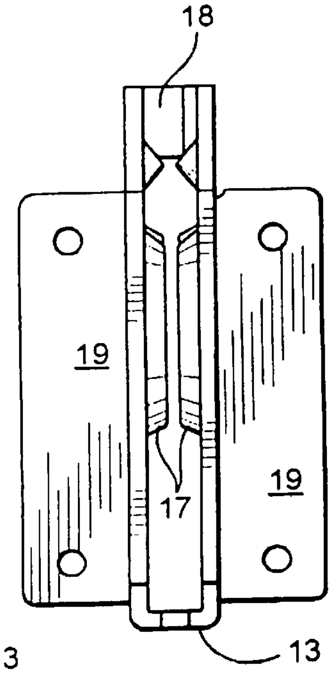
Figure 11:
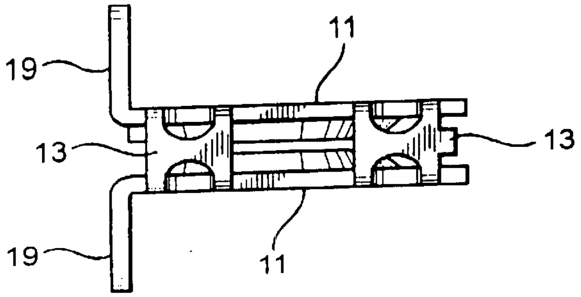
Figure 12:
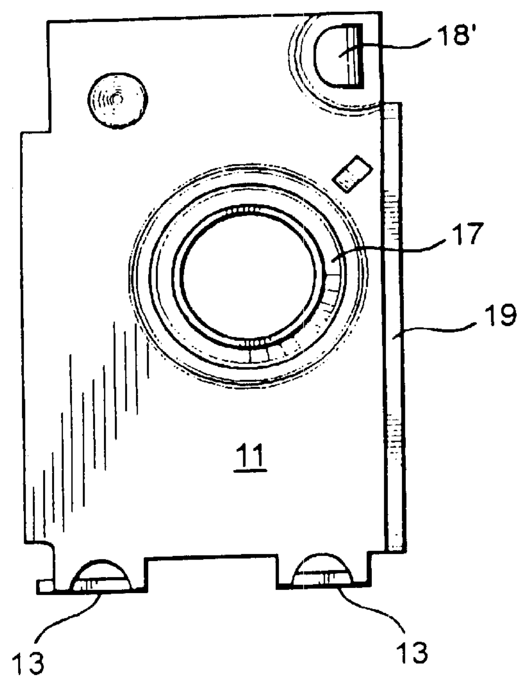
FIG. 12 is a side view of the side of the finished casing opposite the side shown in FIG. 7.

Next the casing is folded, as shown in FIG. 3, along curved folds that straddle the bridge holes 21. The presence of these holes facilitates the folding and bending. When this occurs the hook 20, shown in FIGS. 2 and 13, has already been placed between to be sandwich between the two casing sides. Thus this folding brings the hook and cam assembly with the assembly hex socket to be rotatably journaled in the bosses 17 for pivotal movement within the casing.

As the two casing sides are brought towards a position parallel with one another, the tab 18 is passed through a small slot 23 in a corner of the opposite casing side 11. Once through, the tab tip 18' is bent or swaged over and flush against the side 11 about the slot 23. This interlocks and fastens the ends of the sides opposite their sides from which the bridges 13 extend.

Figure 13:
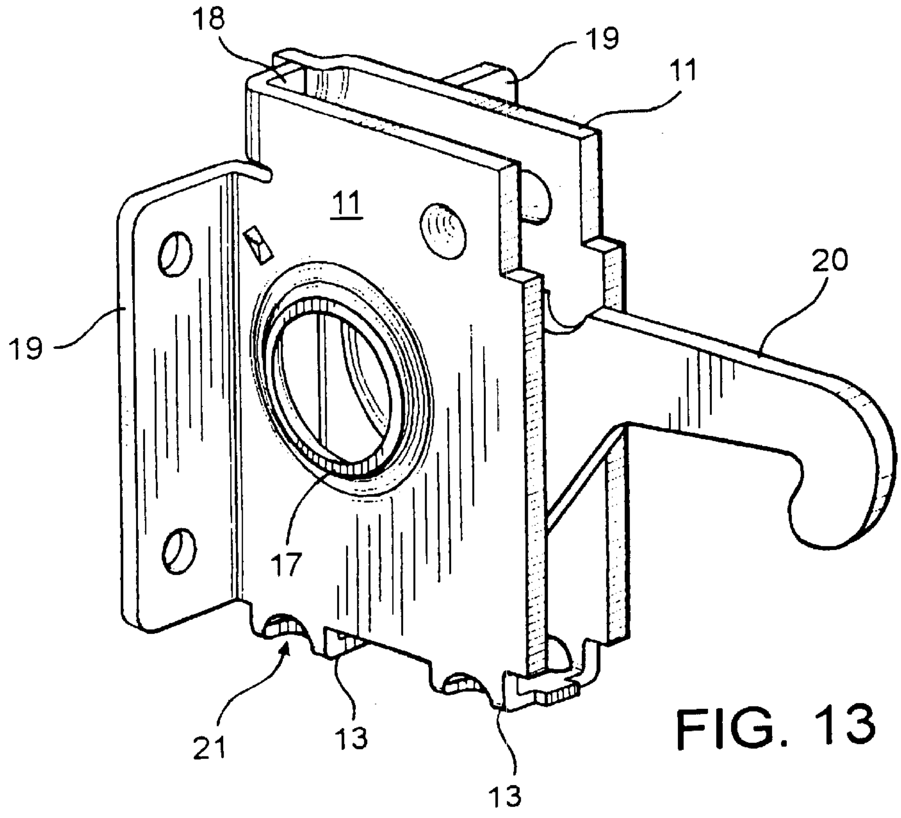
FIG. 13 is a perspective view of the finished panel fasteners with an eye portion of the hook, cam and socket not shown.

The finished panel casing is shown in FIGS. 8–12 without the hook assembly. FIG. 13 shows the panel fastener with the hook 20 projecting out of an open end of the casing in its locked position. The eye end of the hook, and its cam and socket, are not shown here. The hook may be rotated to an upright, unlocked position with a socket wrench inserted into the hook and cam assembly socket that is mounted within the eye portion of the hook. Fully rotated uprightly, the hook is stopped by engagement with the tab 18.

It thus is seen that a panel fastener is now provided that is substantially free of problems long associated with those of the prior art. It may be made expeditiously and efficiently with a single unitary casing. Made in this manner it has far less scrap metal waste and is far easier to position the casing sides accurately and to monitor such accuracy. More importantly, it is far less susceptible to failure from overloads exerted on the hook from misalignment and/or miss-pacing from the mating bar assembly in an adjacent panel. There are no interlocks held by dimples. One end of the casing is unitary with its walls and thus extremely rugged. The other end, with its tab tip crimped over the slot wall, is virtually inseparable absent a fracture of the steel. It also serves as the hook stop.

Though the invention has been described in its preferred form it should be understood that modifications may be made thereto without departure from the spirit and scope of the invention as set forth in the following claims.

What is claimed is:

1. A method of producing a panel fastener which comprises the steps of forming a casing blank with two sides unitarily connected together at one end by a bridge that is formed with two holes along two parallel arcuate folds that straddle and traverse the bridge holes over a hook and cam assembly having a socket to bring the two casing blank sides into a substantially parallel position with their two casing side bosses axially aligned and rotatably capturing and journaling the hook and cam assembly socket with the assembly hook projecting out of the now formed casing.

* * * * *